United States Patent
Masuda et al.

(10) Patent No.: US 12,019,009 B2
(45) Date of Patent: Jun. 25, 2024

(54) MEASUREMENT METHOD, MEASURING DEVICE, AND MEASUREMENT PROGRAM

(71) Applicant: SYSMEX CORPORATION, Kobe (JP)

(72) Inventors: Yuji Masuda, Kobe (JP); Konobu Kimura, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 269 days.

(21) Appl. No.: 17/459,810

(22) Filed: Aug. 27, 2021

(65) Prior Publication Data

US 2022/0065770 A1     Mar. 3, 2022

(30) Foreign Application Priority Data

Aug. 28, 2020    (JP) ................ 2020-144962

(51) Int. Cl.
*G01N 15/1434*     (2024.01)
*G01N 15/01*        (2024.01)
(Continued)

(52) U.S. Cl.
CPC ... *G01N 15/1436* (2013.01); *G01N 2015/016* (2024.01); *G01N 2015/1006* (2013.01); *G01N 2015/1486* (2013.01)

(58) Field of Classification Search
CPC ......... G01N 15/1436; G01N 2015/008; G01N 2015/1006; G01N 2015/1486;
(Continued)

(56) References Cited

U.S. PATENT DOCUMENTS

| 6,285,377 B1 * | 9/2001 | Greenbaum | .......... G06T 11/206 600/300 |
| 2002/0086344 A1 * | 7/2002 | Tsuji | .................. G01N 33/6863 435/39 |

(Continued)

FOREIGN PATENT DOCUMENTS

| EP | 2843409 B1 | 11/2016 |
| EP | 3258263 A1 | 12/2017 |

(Continued)

OTHER PUBLICATIONS

Extended European search report dated Jan. 28, 2022 in European patent application No. 21192995.5.
(Continued)

*Primary Examiner* — Roy M Punnoose
(74) *Attorney, Agent, or Firm* — Crowell & Moring LLP

(57) ABSTRACT

A measurement method, a measurement device, and a measurement program for acquiring information related to lipid particles contained in a measurement sample prepared without using a fluorescent dye are provided. The problem is resolved by the measurement method for measuring the number of particles in a measurement sample prepared without using a fluorescent dye, the method including obtaining information related to lipid particles contained in the measurement sample based on a plurality of characteristic values regarding light scattering in each particle obtained by a flow cytometer from the individual particles contained in the measurement sample.

16 Claims, 14 Drawing Sheets

(51) Int. Cl.
*G01N 15/10* (2006.01)
*G01N 15/14* (2006.01)

(58) Field of Classification Search
CPC ....... G01N 15/1429; G01N 2015/1402; G01N 15/14; G01N 15/1434; G01N 2015/0065; G01N 2015/0069; G01N 2015/0084
See application file for complete search history.

(56) References Cited

U.S. PATENT DOCUMENTS

| | | |
|---|---|---|
| 2003/0219850 A1* | 11/2003 | Tsuji .................... G01N 1/30 |
| | | 435/40.5 |
| 2008/0153170 A1 | 6/2008 | Garrett et al. |
| 2017/0350804 A1 | 12/2017 | Ye et al. |
| 2020/0150021 A1* | 5/2020 | Ohsaka ................ G16H 50/30 |

FOREIGN PATENT DOCUMENTS

| | | |
|---|---|---|
| EP | 3410114 A1 | 12/2018 |
| JP | 2002-223791 A | 8/2002 |

OTHER PUBLICATIONS

A Communication pursuant to Article 94(3) EPC dated Dec. 7, 2023 in a counterpart European patent application No. 21192995.5, 8 pages.
The Japanese Office Action issued on Mar. 5, 2024 in a counterpart Japanese patent application No. 2020-144962.

* cited by examiner

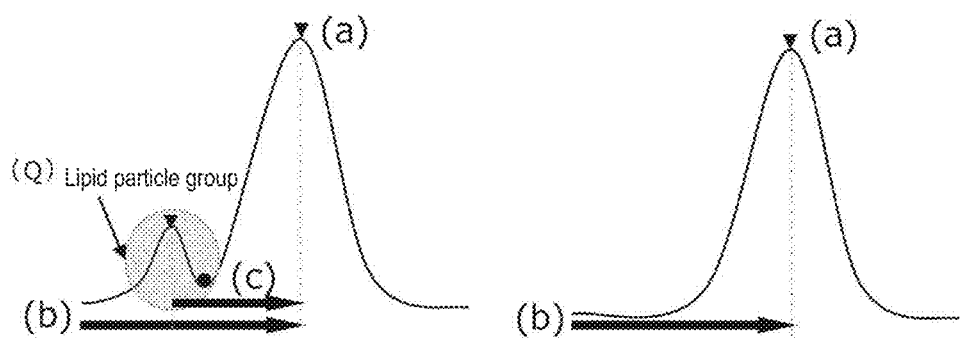
FIG. 3A: Lipid particles present
FIG. 3B: Lipid particles not present

| | Maximum maximum value | Maximum value | Fractionation position | WBC (After refractionation) | Lipid particles (After refractionation) | Lipid particles/ (WBC+lipid particles) |
|---|---|---|---|---|---|---|
| #1 | 14 | 10 | 11 | 6480 | 482 | 6.90% |
| #2 | 14 | 10 | 11 | 6241 | 992 | 13.7% |
| #3 | 14 | 10 | 11 | 6334 | 1079 | 14.6% |
| #4 | 14 | 9 | 11 | 6168 | 913 | 12.9% |
| #5 (Negative) | 14 | 14 | - | 2951 | 0 | 0 |

| Dataset | X | Y | Z | ALL |
|---|---|---|---|---|
| Number | 12,403 | 7,846 | 5,000 | 25,249 |
| BF, CTRL Excluded | 9,873 | 7,144 | 4,711 | 21,728 |
| Lipid particle detection sample (True Positive) | 25 | 23 | 13 | 61 |

FIG. 14

| | WBC-D [/μL] (Reference) | WBC-C [/μL] Pre-correction | WBC-C [/μL] Post correction | Deviation from WBC-D Pre-correction | Deviation from WBC-D Post correction |
|---|---|---|---|---|---|
| #1 | - | 8,530 | 7,940 | - | - |
| #2 | 7,650 | 9,060 | 7,820 | +1,410 (+18.4%) | +170 (+2.2%) |
| #3 | 7,750 | 9,300 | 7,940 | +1,550 (+20.0%) | +190 (+2.5%) |
| #4 | 7,710 | 8,870 | 7,730 | +1,160 (+15.0%) | +20 (+0.3%) |
| #5 (Negative) | - | 3,610 | 3,610 | - | - |

MEASUREMENT METHOD, MEASURING DEVICE, AND MEASUREMENT PROGRAM

RELATED APPLICATIONS

This application claims priority to Japanese Patent Application No. 2020-144962, filed on Aug. 28, 2020, the entire content of which is incorporated herein by reference.

BACKGROUND OF THE INVENTION

1. Field of the Invention

The present specification discloses a measurement method, a measuring device, and a measurement program.

2. Description of the Related Art

Japanese Patent Publication No. 2002-223791 discloses an automatic blood cell counter that, classifies and counts bone marrow nucleated cells, erythroblast cells, and leukocyte cells, respectively using the difference in intensity between scattered light and fluorescence in blood cells stained with fluorescent dyes and counting cells with a flow cytometer. Japanese Patent Publication No. 2002-223791 further discloses that leukocyte cells and lipid particles can be distinguished since lipid particles are not stained by the fluorescent dye even when the lipid particles are contained in the measurement sample.

SUMMARY OF THE INVENTION

When using the measurement mode in which a fluorescent dye is not used and the measurement sample contains lipid particles, the counting result of the nucleated cells may be affected by the lipid particles.

The present invention provides a measurement method, a measuring device, and a measurement program capable of providing an accurate measurement result of the number of particles contained in the measuring sample even when the measurement sample prepared without using a fluorescent dye contains lipid particles.

One aspect of the present invention relates to a measurement method for measuring a number of particles in a measurement sample prepared without using a fluorescent dye. As shown in FIG. 2, the measurement method includes obtaining information related to lipid particles contained in the measurement sample based on a plurality of feature values regarding light scattering from each particle, the feature values being obtained by a flow cytometer from individual particles contained in the measurement sample.

One aspect of the present invention relates to a measurement device (200) for measuring a number of particles in a measurement sample prepared without using a fluorescent dye. As shown in FIG. 7, the measurement device (200) includes a flow cytometer (230) and a processing unit (201). The processing unit (201) obtains information related to lipid particles contained in the measurement sample based on a plurality of feature values regarding light scattering from each particle, the feature values being obtained by a flow cytometer (230) from individual particles contained in the measurement sample.

One aspect of the present invention relates to a measurement program for measuring a number of particles in a measurement sample prepared without using a fluorescent dye. As shown in FIG. 2, the measurement program, when executed by computer, executes steps of obtaining information related to lipid particles contained in the measurement sample based on a plurality of feature values regarding light scattering from each particle, the feature values being obtained by a flow cytometer from individual particles contained in the measurement sample prepared without using a fluorescent dye.

According to these aspects, information relating to lipid particles contained in a measurement sample can be obtained from a plurality of measured values regarding the scattered light from each particle acquired by the flow cytometer.

According to the present invention, a measurement sample containing lipid particles is measured in a measurement mode that does not use a fluorescent dye by acquiring information of lipid particles contained in a measurement sample based on feature values related to light scattering, and provides accurate particle number measurement results.

BRIEF DESCRIPTION OF THE DRAWINGS

FIG. 1 shows an example of a scattergram.

FIG. 2 shows an example of a method for acquiring information on lipid particles.

FIG. 3A is an example of a histogram obtained from a measurement sample containing lipid particles;

FIG. 3B is an example of a histogram obtained from a measurement sample containing no lipid particles;

FIG. 14 shows the white blood cell count (WBC-D) measured in the DIFF mode, the white blood cell count (before WBC-C correction) measured in the normal CBC mode, and the white blood cell count measured by the measurement method of the present embodiment for the peripheral blood sample (after WBC-C correction).

DETAILED DESCRIPTION OF THE PREFERRED EMBODIMENTS

Figure 1A:
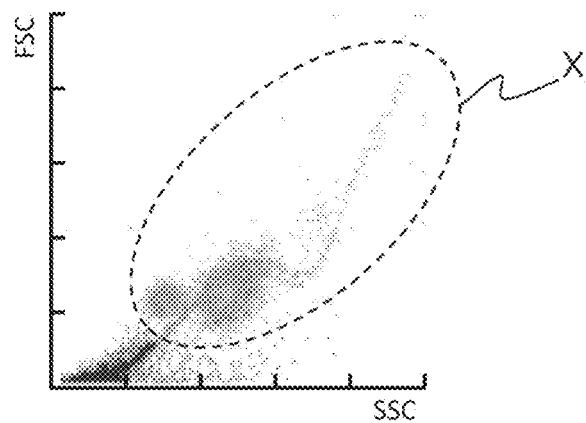
FIG. 1A shows the scattergram of the pulse peak (SSC) of the side scattered light signal and the pulse peak (FSC) of the forward scattered light signal.

1. Measurement Method (1) Summary of Measurement Method

One embodiment of the present invention relates to a measurement method for measuring the number of particles in a measurement sample. The measurement of the number of particles in this embodiment is performed using a measurement system 100 which is a fully automatic blood cell counting device including a flow cytometer (FCM) detection unit 230 shown in FIG. 8 which will be described later. In the present embodiment, the number of particles is measured by the CBC measurement mode in the fully automatic blood cell counter, and the particles to be counted in this case are white blood cells. The measurement system 100 shown in FIG. 7, which will be described later, includes blood cells contained in a sample by one or a plurality of measurement modes selected by the user from a plurality of measurement modes including a white blood cell classification (DIFF) measurement mode in addition to the CBC measurement mode. Can be counted. The measurement system 100 prepares a measurement sample using different reagents depending on the measurement mode by the sample preparation unit 220 included in the measurement device 200. The measurement sample prepared in the DIFF measurement mode contains a fluorescent dye for staining particles, specifically, a polymethine-based dye, but the measurement sample for leukocyte measurement prepared in the CBC measurement mode does not contain a fluorescent dye. In the present embodiment, the measurement system 100 prepares a measurement sample for measuring leukocytes containing no fluorescent dye in the CBC measurement mode by the sample preparation unit 220, and an example in which the leukocytes and lipid particles contained in the measurement sample are fractionated without using fluorescence parameters will be described.

In this measurement method, the FCM detection unit 230 shown in FIG. 8 and which will be described later is used to irradiate laser light on the particles in the measurement sample flowing through the flow cell 230j, detect the light scattering generated from the particles, and count the particles in the measurement sample. There are multiple parameters related to light scattering. The parameters include parameters defined by the scattering direction, for example, forward scattered light, side scattered light, and the like. The forward scattered light refers to the light scattered forward with respect to the traveling direction of the irradiation light when the particles are irradiated with the light. The side scattered light refers to the light scattered laterally with respect to the traveling direction of the irradiation light when the particles are irradiated with the light. Another parameter related to light scattering is axial light loss. The axial light loss is a parameter that quantifies the decrease in the amount of light received on the light receiving portion side due to light scattering when the particles cross the laser. The waveform representing the change over time of the signal is acquired for each light scattering parameter, and the pulse shape corresponding to each particle is analyzed to obtain the pulse peak (also called peak height) and pulse width (also called distribution width) as feature values. The pulse peak of the forward scattered light signal is a feature value mainly indicating the size of particles. The pulse peak of the side scattered light signal is a feature value that represents the complexity of the structure inside the particle. The pulse width of the forward scattered light signal is a feature value indicating the time during which the particle passes through the region of the flow cell where the light is irradiated, and reflects the length of the particle.

Figure 1B:
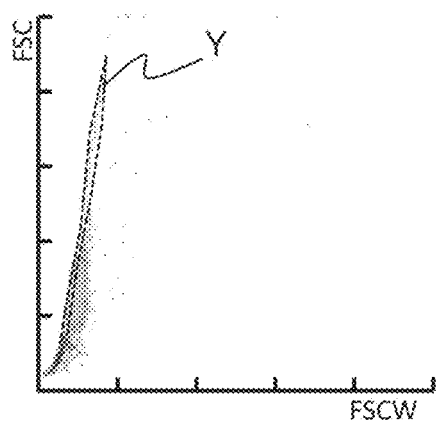
FIG. 1B shows the scattergram by the pulse width (FSCW) of the forward scattered light signal and the pulse peak (FSC) of the forward scattered light signal.

The light scattering feature values obtained for each particle are shown, for example, as scattergrams (two-dimensional dot plots). FIG. 1A shows the pulse peak (SSC) of the side scattered light signal and the pulse peak (FSC) scattergram of the forward scattered light signal of the particle group measured in the CBC measurement mode by providing the white blood cell measurement sample prepared in the CBC measurement mode to the FCM detection unit 230. That is, each dot indicates the coordinates of each particle when the X-axis direction is the pulse peak (SSC) of the side scattered light signal and the Y-axis direction is the pulse peak (FSC) of the forward scattered light signal. The dots included in the area surrounded by the dotted line shown in FIG. 1A are shown in light colors and are counted as "white blood cell count" in the CBC measurement mode. The area surrounded by the dotted line may be referred to as a "count area" below. FIG. 1B is a scattergram with the pulse width (FSCW) of the forward scattered light signal and the pulse peak (FSC) of the forward scattered light signal. That is, each dot indicates the coordinates of each particle when the X-axis direction is the pulse peak (FSCW) of the forward scattered light signal and the Y-axis direction is the pulse peak (FSC) of the forward scattered light signal.

Figure 1C:
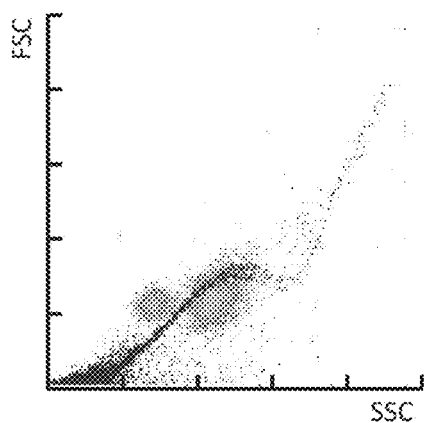
FIG. 1C shows a scattergram in which lipid particle dots are identified.

All the dots in the area surrounded by the broken line X in FIG. 1A are shown in light colors. As shown in FIG. 1C, the present inventors discovered a region containing dots (referred to as lipid particle dots) shown in dark colors, which should normally be classified as lipid particles, overlapping with the white blood cell count region. In FIG. 1A, the lipid particle dots overlap with the white blood cell count region and cannot be distinguished. Therefore, the lipid particle dots may also be counted in the white blood cell count. Also, in FIG. 1B, the distribution region of the leukocyte dots indicated by the dotted line Y overlap with the lipid particle dots indicated by the broken line X.

In order to detect lipid particle dots overlapping the distribution region of leukocyte dots in this measurement method, after acquiring a plurality of feature values related to light scattering described above from individual particles contained in a measurement sample, the acquired light scattering Information related to the lipid particles contained in the measurement sample is acquired based on a plurality of feature values relating to the measurement sample.

An example of a method for obtaining information related to lipid particles will be described with reference to FIG. 2. For convenience, a method of acquiring information related to lipid particles will be described using the measured value of the pulse width of the forward scattered light signal and the measured value of the pulse peak of the forward scattered light signal.

Figure 2A:
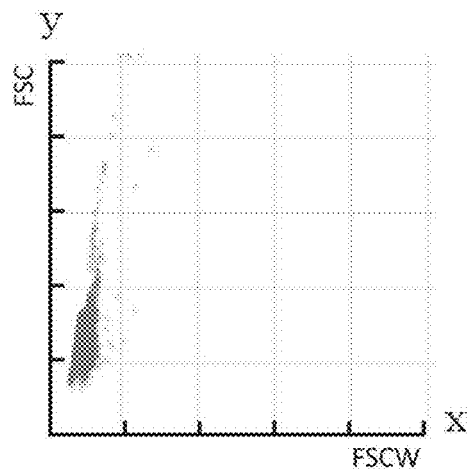
FIG. 2A shows a scattergram in which the x-axis direction is the pulse width (FSCW) of the forward scattered light signal and the y-axis direction is the pulse peak (FSC) of the forward scattered light signal.

FIG. 2A is a scattergram in which the X-axis direction is the pulse width (FSCW) of the forward scattered light signal and the Y-axis direction is the pulse peak (FSC) of the forward scattered light signal. The coordinates of each dot in FIG. 2A are represented by (x, y)=(measured value of the pulse width of the forward scattered light signal, measured value of the pulse peak of the forward scattered light signal).

As the first step, the two-dimensional coordinates (x, y) of each dot are converted by a rotation matrix, and the two-dimensional coordinates (x', y') are obtained as the converted coordinates.

The conversion formula is represented by the following.

$$x'=x \cos \theta - y \sin \theta$$

$$y'=x \sin \theta + y \cos \theta \qquad \text{Function 1}$$

Here, θ indicates the rotation angle of the rotation matrix. The two-dimensional dot plot of the converted two-dimensional coordinates (x', y') is the plot shown in FIG. 2B.

The rotation angle θ is set so that the variance of the coordinate group after conversion is maximized. More specifically, θ is determined by dimensional transformation, preferably principal component analysis. When dimensional conversion is performed by principal component analysis, the x'-axis direction represents the first principal component (PCA1), and the y'-axis direction is the second principal component (PCA2).

In the two-dimensional dot plot before conversion, the scale of each axis is represented by channels from 0 to 255, for example, while the scale of the x'-axis after conversion is the display range of channels from 0 to 50.

Although the rotation angle θ may be determined for each measurement sample, the rotation angle θ also may be set in advance and the same rotation angle may be applied to all the measurement samples. When the rotation angle θ is set in advance, it can be set to about 10.2° to 10.5°. The direction of rotation is intended to rotate counterclockwise when the rotation angle θ is a positive value, and to rotate clockwise when the rotation angle θ is a negative value.

Figure 2B:
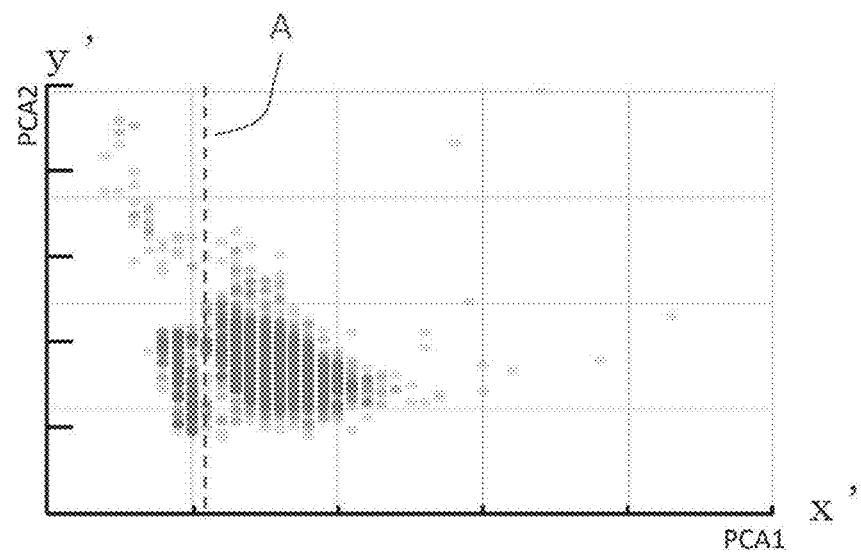
FIG. 2B shows a two-dimensional dot plot after conversion.

The present inventor discovered that it is possible to separate the leukocyte count region located on the x'-axis high value side relative to the boundary line A and the lipid particle dot region located on the x'-axis low value side (origin side) relative to the boundary line A by drawing the boundary line A on the x'-axis on the two-dimensional dot plot of the converted two-dimensional coordinates (x', y') shown in FIG. 2B, wherein the lipid particle dots overlapping the leukocyte count region of FIG. 2A are plotted via performing this conversion.

Figure 2C:
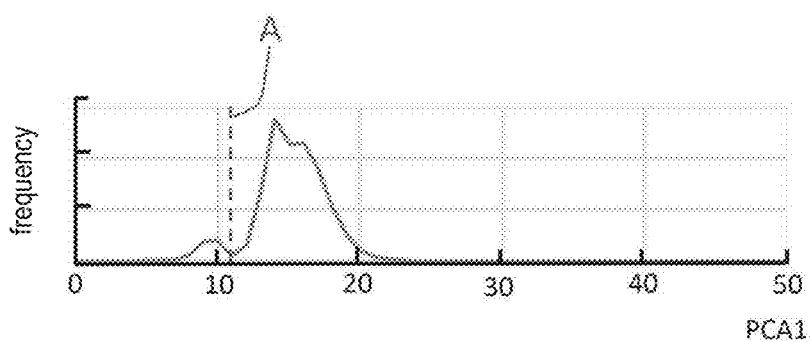
FIG. 2C shows a histogram obtained by projecting B in the direction of the first principal component.

As the second step, the converted two-dimensional dot plot is projected in the direction of the first principal component. Projecting in the direction of the first principal component is intended to set y' of all dots to "0" in the converted two-dimensional coordinates (x', y'). By doing so, the histogram shown in FIG. 2C can be obtained. The white blood cell count region located on the x'-axis high value side and the lipid particle dot region located on the x'-axis low value side relative to the boundary line A can be separated by drawing the boundary line A on the histogram of FIG. 2C, and can be clearly distinguished from the case of the two-dimensional dot plot shown in FIG. 2B. Note that the boundary line A shown in FIG. 2B and the boundary line A shown in FIG. 2C are indicated by a common broken line as a boundary line between the white blood cell count region and the lipid particle dot region.

As the third step, a determination is made as to whether the lipid particle group exists by using the histogram obtained in the second step. An example of the third step will be described with reference to FIG. 3. FIG. 3A is an example of a histogram obtained from a measurement sample containing lipid particles, and FIG. 3B is an example of a histogram obtained from a measurement sample that does not contain lipid particles.

For example, on the right end side of the histograms of FIGS. 3A and 3B, the peak (a) is analyzed with respect to the histogram obtained in the second step. The symbol ▼ shown in FIGS. 3A and 3B indicates the peak position acquired by peak analysis.

Next, in (b) shown at the left end (channel 0) of the histograms of FIGS. 3A and 3B, the highest peak position among the peak positions of the detected peaks is specified. The highest peak position is the peak derived from the originally intended cell group. Then, a search is performed to determine whether there is another peak Q between the left end (channel 0) of the histogram and the highest peak position. In FIG. 3A, since there is another peak Q between channel 0 and the channel at the highest peak position, it can be determined that there is a lipid particle group. In FIG. 3B, since there is no other peak Q between channel 0 and the channel at the highest peak position, it can be determined that there is no lipid particle group.

When it is determined that there is a lipid particle group in (b) shown at the left end (channel 0) of the histograms of FIGS. 3A and 3B, the bottom (minimum value) for fractionating the cell group and the lipid particle group is searched for in (c) shown between the left end (channel 0) and the right end of the histogram of FIG. 3A. The search for the bottom (minimum value) is preferably performed between the channel at the highest peak position and the channel at the position of another peak Q detected by the search on (b) shown at the left end (channel 0) of the histogram in FIG. 3A. By setting the bottom (minimum value) as the fractionation position, the lipid particle dot group can be extracted from the two-dimensional dot plot before conversion.

Figure 4:
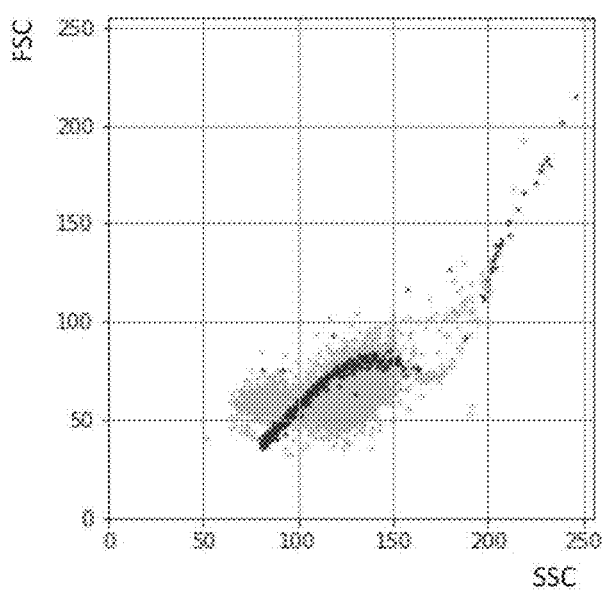
FIG. 4 shows an example in which the color (contrast) of the extracted lipid particle dot group is changed and displayed.

In the fourth step, information on the lipid particles is generated for the lipid particle dot group extracted in the third step. FIG. 4 shows an example in which the shades of the extracted lipid particle dot groups are changed and displayed in a two-dimensional dot plot of a pulse peak (SSC) of a side scattered light signal and a pulse peak (FSC) of a forward scattered light signal. Shown. The lipid particle dot group overlapping the white blood cell count region is shown in dark color and can be identified. Information about the lipid particles is generated by counting the identified lipid particle dots. Information of lipid particles includes qualitative, semi-quantitative, or quantitative information regarding the presence/absence of fat particles in the measured particle group, content, and the like. Preferably, the information relating to the lipid particles is the abundance ratio of the lipid particles in the measured particle group, or the number of lipid particles.

In the fifth step, based on the information of the lipid particles, or the information based on the determination result of whether the lipid particles are present, the correction value of the white blood cell count, which is obtained by subtracting the count of the lipid particle dot group from the white blood cell count, is generated.

The information based on the determination result of the presence/absence of lipid particles is the information on the reliability of the measured value of the white blood cell count. The information regarding the reliability of the white blood cell count measurement is a label indicating whether the white blood cell count measurement includes a count of lipid particles. The information regarding the reliability of the measured value of the white blood cell count also may be a label indicating the amount of lipid particles contained in the counted white blood cells semi-quantitatively or quantitatively. Semi-quantitative can be expressed, for example, by "high" or "low" lipid particle content. Alternatively, the information regarding the reliability of the white blood cell count measured value may be the reliability of the white blood cell count measured value according to the information regarding the lipid particles. For example, if lipid particles are not detected or are few, a label indicating "high reliability" can be indicated. When the lipid particles are medium to high, a label indicating "low reliability" also can be indicated.

The information on the reliability of the measured value of the white blood cell count is output when a preset predetermined value, for example, when the abundance ratio of the lipid particles is 3% or more of the detected total particles, or when the number of the lipid particles is a predetermined ratio with respect to the white blood cell count, for example, 3% or more. Preferably, the information regarding the reliability of the measured value of the leukocyte count is output when the number of lipid particles is 50 or more and the abundance ratio of the lipid particles is 3% or more of the total number of particles, or when the number of lipid particles is 3% or more of the leukocyte count.

(2) Modification Example

Figure 5A:
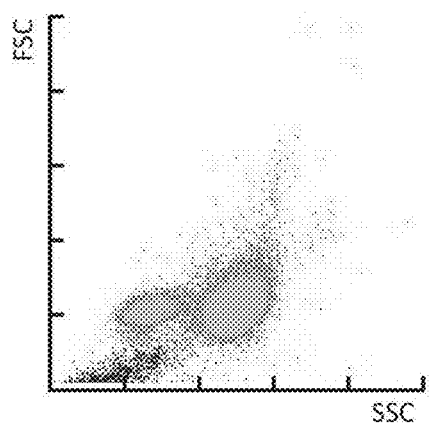
FIG. 5A shows a scattergram of a pulse peak (SSC) of a laterally scattered light signal-pulse peak (FSC) of a forward scattered light signal in a sample having a large number of nucleated cells.
Figure 5B:
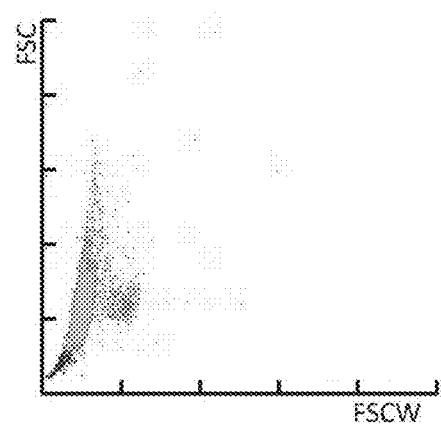
FIG. 5B shows a scattergram of the pulse width (FSCW) of the forward scattered light signal-pulse peak (FSC) of the forward scattered light signal in a sample having a large number of nucleated cells is shown.
Figure 5C:
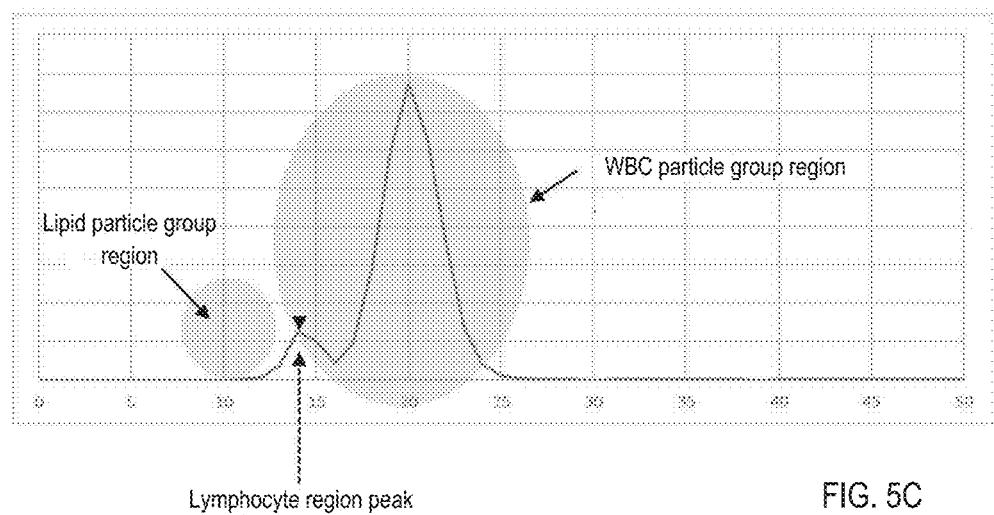
FIG. 5C shows a rotated and projected scattergram of B.

When the lipid particle group shown in the third step is detected, and the number of nucleated cells contained in the sample, particularly when the majority are lymphocytes as shown in FIGS. 5A and 5B, it may be difficult to distinguish between the peak of the lymphocyte count region and the peak of the lipid particles (see FIG. 5C). In this case, when searching for the peak of the lipid particles, it is preferable to limit the search range to a preset range and generate information on the lipid particles. Since the lipid particle peak often appears on the PCA1 axis lower value side than the region where the lymphocyte peak appears, the search range of the lipid particle peak is limited to the low value side of the lymphocyte maximum value appearance region.

In a two-dimensional dot plot of the pulse width (FSCW) of the forward scattered light signal and the pulse peak (FSC) of the forward scattered light signal, erythrocytes infected with Plasmodium may appear in the region where lipid particle dots appear. Red blood cells infected with Plasmodium malaria can be distinguished from other particles in the two-dimensional dot plot of the pulse peak (FSC) of the laterally scattered light signal and the pulse peak (SSC) of the forward scattered light signal, and since counting is possible, information on lipid particles can be obtained by subtracting the count of red blood cells infected with Plasmodium from the count of lipid particles.

2. Measurement System 2-1. Structure of Measurement System

Figure 6:
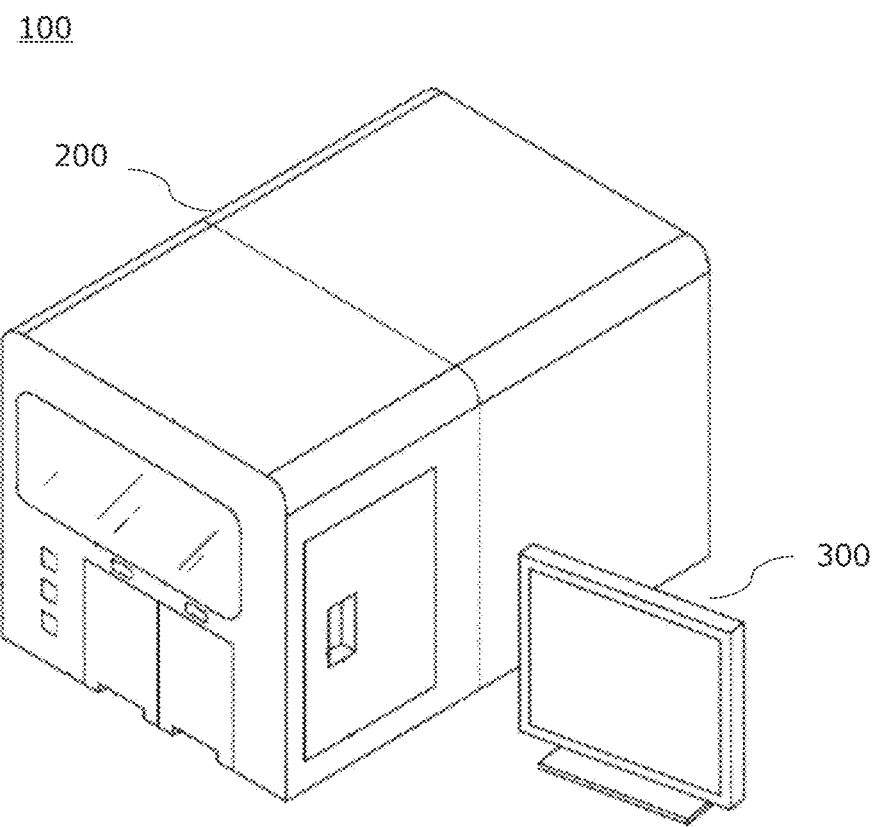
FIG. 6 shows the appearance of the measurement system 100.
Figure 7:
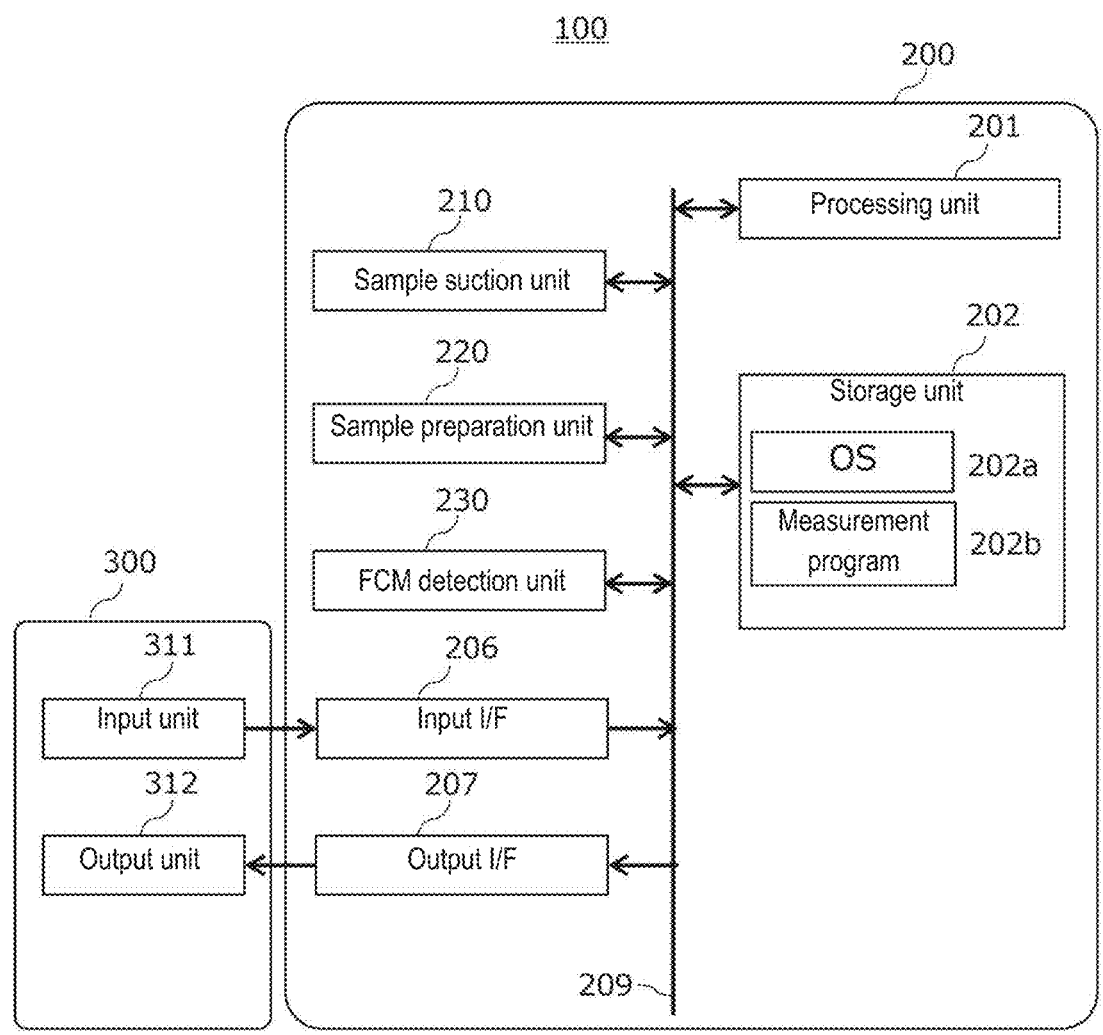
FIG. 7 shows the hardware structure of the measurement system 100.

One embodiment of the present invention relates to a measurement system 100 (hereinafter, simply referred to as "measurement system 100") for measuring the number of cells in a measurement sample containing blood cells. The appearance of the measurement system 100 of this embodiment is shown in FIG. 6. The measurement system 100 includes a measurement device 200 and a touch panel type display 300. The hardware structure of the measurement system 100 is shown in FIG. 7. The measurement system 100 is connected to a display 300 including an input unit 311 and an output unit 312.

(2) Hardware Structure of Measurement Device 200

In the measurement device 200, the sample suction unit 210, the sample preparation unit 220, the FCM detection unit 230, the processing unit 201, the storage unit 202, the input interface (I/F) 206, and the output interface (I/F) 207 are communicably connected to each other by bus 209. The storage unit 202 stores the measurement program 202b including the measured value, the rotation angle $\theta$ of the rotation matrix, the algorithm for calculating the rotation angle $\theta$, and the peak analysis program.

The sample suction unit 210 suctions the sample from the sample container containing the sample through a nozzle and dispenses it into the reaction tank provided in the sample preparation unit 220. The sample preparation unit 220 supplies a reagent to the reaction vessel and prepares a measurement sample by mixing the sample and the reagent. The reagent used by the sample preparation unit 220 differs depending on the measurement mode. The sample preparation unit 220 mixes a dilution fluid and a hemolytic agent as reagents with the sample in order to prepare a measurement sample for counting white blood cells in the CBC measurement mode. The sample preparation unit 220 mixes a dilution fluid, a hemolytic agent, and a fluorescent dye as reagents with the sample in order to prepare a measurement sample for classifying and counting leukocytes in the DIFF measurement mode. The measurement sample prepared in the CBC measurement mode does not contain a fluorescent dye.

The processing unit 201 is the CPU of the measurement device 200. The processing unit 201 may cooperate with the GPU. The processing unit 201 executes the measurement program 202b in cooperation with the operation system (OS) 202a stored in the storage unit 202, and processes the acquired data.

The storage unit 202 is composed of a hard disk. The storage unit 202 records the measurement program 202b executed by the processing unit 201 and the data used for the measurement program 202b. The ROM stores a boot program executed by the processing unit 201 when the measurement device 200 is started, and programs and settings related to the operation of the hardware of the measurement device 200.

The input I/F 206 is configured by a serial interface, a parallel interface, an analog interface, and the like. The input I/F 206 accepts character input, click input, voice input, and the like from the input unit 311. The received input content is stored in the storage unit 202.

The input unit 311 is configured by a touch panel, a keyboard, a mouse, a pen tablet, a microphone, and the like, and inputs characters or audio to the measurement device 200. The input unit 311 also may be connected from the outside of the measurement device 200 or may be integrated with the measurement device 200.

The output I/F 207 is configured by an interface similar to that of the input I/F 206, for example. The output I/F 207 outputs the information generated by the processing unit 201 to the output unit 312. The output I/F 207 outputs the information generated by the processing unit 201 and stored in the storage unit 202 to the output unit 312.

The output unit 312 is configured by, for example, a display, a printer, or the like, and displays a detection result transmitted from the FCM detection unit 230, various operation windows in the measuring device 200, an analysis result, and the like.

An operating system that provides a graphical user interface environment such as Windows (registered trademark) manufactured and sold by Microsoft Corporation in the United States is installed in the storage unit 202. The application program according to this embodiment shall operate on the operating system. That is, the measurement device 200 can be a personal computer or the like.

The FCM detection unit 230 of the measurement device 200 configuring the measurement system 100 may be arranged at another location and connected by a network.

(3) FCM Detection Unit

Figure 8:
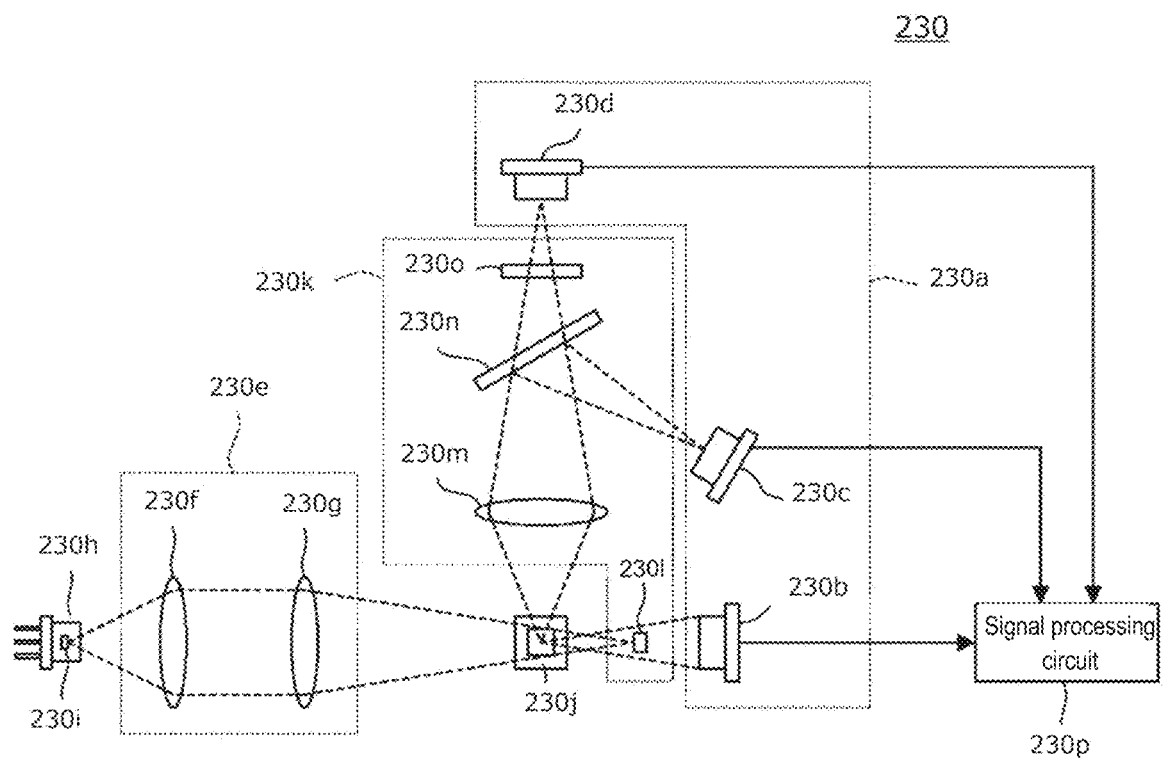
FIG. 8 shows the structure of the FCM detection unit 230.

FIG. 8 shows the hardware structure of the FCM detection unit 230. The FCM detection unit 230 may be referred to as a flow cytometer 230 in the present specification.

As shown in FIG. 8, the FCM detection unit 230 includes a flow cell 230j, a detection unit 230a, an irradiation optical system 230e, a light receiving optical system 230k, and a signal processing circuit 230p.

The flow cell 230j flows the measurement sample prepared by the sample preparation unit 220. The laser beam emitted from the laser diode 230i irradiates the measurement sample flowing through the flow cell 230j. When the measurement sample is irradiated with laser light, light is generated from the particles in the measurement sample. The photodetectors 230b to 230d of the detection unit 230a acquire optical information from the particles in the measurement sample irradiated with the laser beam by receiving the forward scattered light (FSC), the side scattered light (SSC), and the side fluorescence (SFL) generated from the particles in the measurement sample, respectively.

The irradiation optical system 230e includes a collimator lens 230f and a condenser lens 230g. The collimator lens 230f converts the laser light emitted from the laser diode 230i into parallel light. The condenser lens 230g collects the laser light converted into parallel light and irradiates the flow cell 230j. In this way, the irradiation optical system 230e irradiates the measurement sample flowing through the flow cell 230j with the laser light emitted from the laser diode 230i. When the measurement sample is irradiated with laser light, forward scattered light (FSC) and side scattered light (SSC) are generated from the particles in the measurement sample.

The light receiving optical system 230k includes a beam stopper 230l, a condenser lens 230m, a dichroic mirror 230n, and a spectroscopic filter 230o. The beam stopper 230l blocks the laser light transmitted through the flow cell 230j without irradiating the particles among the laser light irradiated to the flow cell 230j. The photodetector 230b is a photodiode. The photodetector 230b receives the forward scattered light (FSC) and outputs an electric signal according to the intensity of the forward scattered light (FSC).

The condenser lens 230m collects side scattered light (SSC). The dichroic mirror 230n reflects side scattered light (SSC). The photodetector 230c is a photodiode. The photodetector 230c receives the side scattered light (SSC) and outputs an electric signal according to the intensity of the side scattered light (SSC). The photodetector 230d is an avalanche photodiode. In this way, the light receiving optical system 230k guides the light generated from the measurement sample to the photodetectors 230b to 230d of the detection unit 230a. Here, the photodetectors 230b to 230d may be photomultiplier tubes.

The signal processing circuit 230p acquires the feature values corresponding to the pulse peak and the pulse width of the forward scattered light (FSC) signal and a side scattered light (SSC) signal, respectively, by performing predetermined signal processing on the electric signals output from the photodetectors 230b to 230d. Specifically, the signal processing circuit 230p sets the received light intensity on the first axis and generates a signal waveform of the digital value over time on the second axis by A/D conversion of the forward scattered light signal output over time from the photodetector 230b, and removes the pulse waveform corresponding to individual particles from the generated digital signal waveform. In the signal processing circuit 230p, the peak height of the extracted pulse waveform is used as the pulse peak value of the forward scattered light (FSC) signal, and the width of the portion of the pulse waveform that exceeds the threshold value is used as the pulse width of the forward scattered light (FSC) signal, and each is output. Similarly, the signal processing circuit 230p outputs the pulse peak value of the side scattered light (SSC) of each particle based on the side scattered light (SSC) signal output from the photodetector 230c over time.

3. Measurement Program

One embodiment of the present invention relates to a measurement program 202b for measuring the number of cells in a measurement sample containing blood cells. The processing flow of the measurement program 202b will be described with reference to FIGS. 9 to 11.

Figure 9:
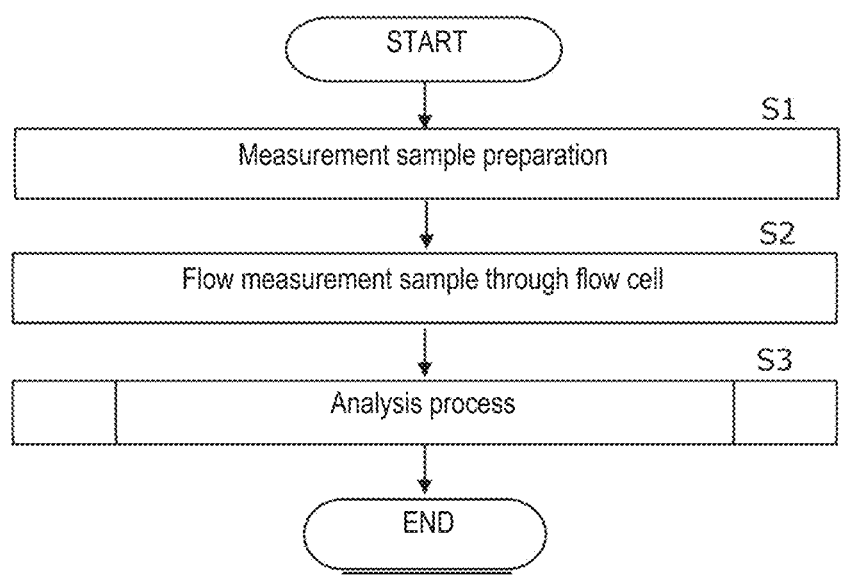
FIG. 9 shows a processing flow of a measurement program.

In step S1 shown in FIG. 9, the processing unit 201 of the measurement device 200 shown in FIG. 7 controls the preparation unit 220 (refer to FIG. 7) to prepare the measurement sample by mixing the sample and the reagent containing no fluorescent dye. Next, in step S2 shown in FIG. 9, the processing unit 201 controls the FCM detection unit 230 (see FIG. 7) so as to irradiate a laser beam on the measurement sample flowing through the flow cell 230j (see FIG. 8). Then, in step S3, the processing unit 201 performs an analysis process based on the optical information acquired from the particles in the measurement sample irradiated with the laser beam.

Figure 10:
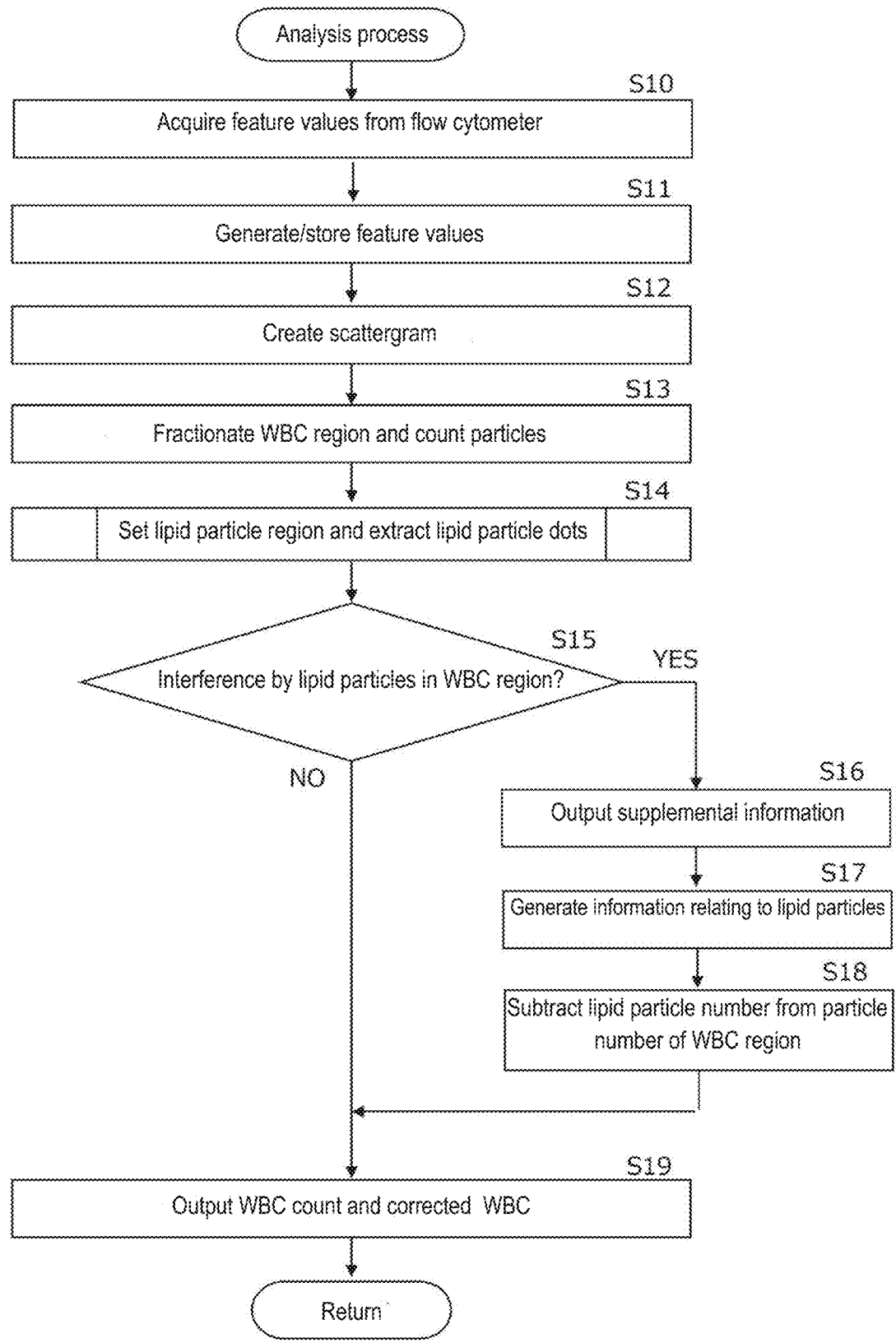
FIG. 10 shows a flow of analysis processing of a measurement program.

The process of step S3 will be described in more detail with reference to FIG. 10.

In step S10, the processing unit 201 acquires the measured values of a plurality of parameters related to the scattered light from the FCM detection unit 230 for each particle. This process is started when the operator inputs a process start request from the input unit 311 and the processing unit 201 accepts this input.

In step S11, the processing unit 201 stores in the storage unit 202 the feature values related to light scattering for each particle acquired in step S10.

In step S12, the processing unit 201 generates a scattergram based on the feature value generated in step S11.

In step S13, the white blood cell count region and other regions are fractionated from the scattergram, and the number of particles existing in the white blood cell count region is counted.

In step S14, the processing unit 201 sets the lipid region and extracts the lipid particle dots.

Figure 11:
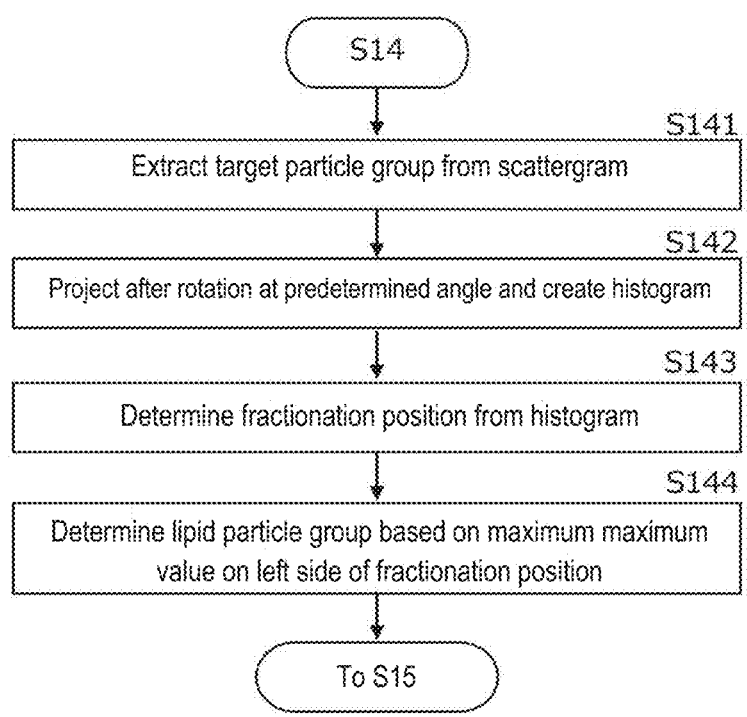
FIG. 11 shows the flow of setting a lipid particle region and extracting lipid particle dots.

The process of step S14 will be described in more detail with reference to FIG. 11.

In step S141, the processing unit 201 extracts a dot group of particles included in the region to be analyzed from the scattergram.

In step S142, the processing unit 201 applies a rotation matrix to the extracted dot group to convert the coordinates on the scattergram, and also projects the coordinates of each dot in the axial direction corresponding to the first principal component. This process corresponds to the first step and the second step described in section 1 above.

In step S143, the processing unit 201 searches for the presence or absence of a plurality of peaks in the histogram obtained in step S142, and if a plurality of peaks are present, and when a plurality of peaks are present, the fractionation position for extracting the lipid particle group is determined. This process corresponds to the first stage of the third step described in section 1 above.

In step S144, the processing unit 201 determines the lipid particle group based on the peak in the region to the left of the fractionation position determined in step S143. This process corresponds to the latter part of the third step described in section 1 above.

Returning to FIG. 10, the processing of the measurement program 202b will be further described. In step S15, the processing unit 201 determines whether the lipid particles interfere with the leukocyte region. When the lipid particle group is detected within a predetermined range in step S14, it can be determined that the lipid particles are interfering with the leukocyte region. The conditions for determining that the lipid particle group was detected within a predetermined range are the same as the conditions for outputting the information relating to the reliability of the measured value of the white blood cell count in section 1 above.

If the determination result is "NO" in step S15, the processing unit 201 proceeds to step S19, outputs the white blood cell count to the output unit 312, and ends the process.

If the determination result is "YES" in step S15, the processing unit 201 proceeds to step S16 and outputs auxiliary information, which is information based on the determination result of whether lipid particles are present, to the output unit 312. This step corresponds to the fourth step described in section 1 above.

Subsequently, the processing unit 201 proceeds to step S17, counts the number of particles determined to be lipid particles in step S14, and generates information on the lipid particles.

The processing unit 201 then proceeds to step S18, and the processing unit 201 generates a correction value for the white blood cell count, which is obtained by subtracting the count of the lipid particle dot group from the white blood cell count. This step corresponds to the fifth step shown in section 1 above.

The processing unit 201 continues to step S19 and outputs the correction value of the white blood cell count from the output unit 312.

4. Storage Medium Recording Computer Programs

The computer program that executes the processing of steps S10 to S19 and steps S141 to S144 can be provided as a program product such as a storage medium. The computer program is stored in a semiconductor memory element such as a hard disk or a flash memory, or a storage medium such as an optical disk. The storage format of the program in the storage medium is not limited insofar as the control unit can read the program.

Figures 12A, 12B:
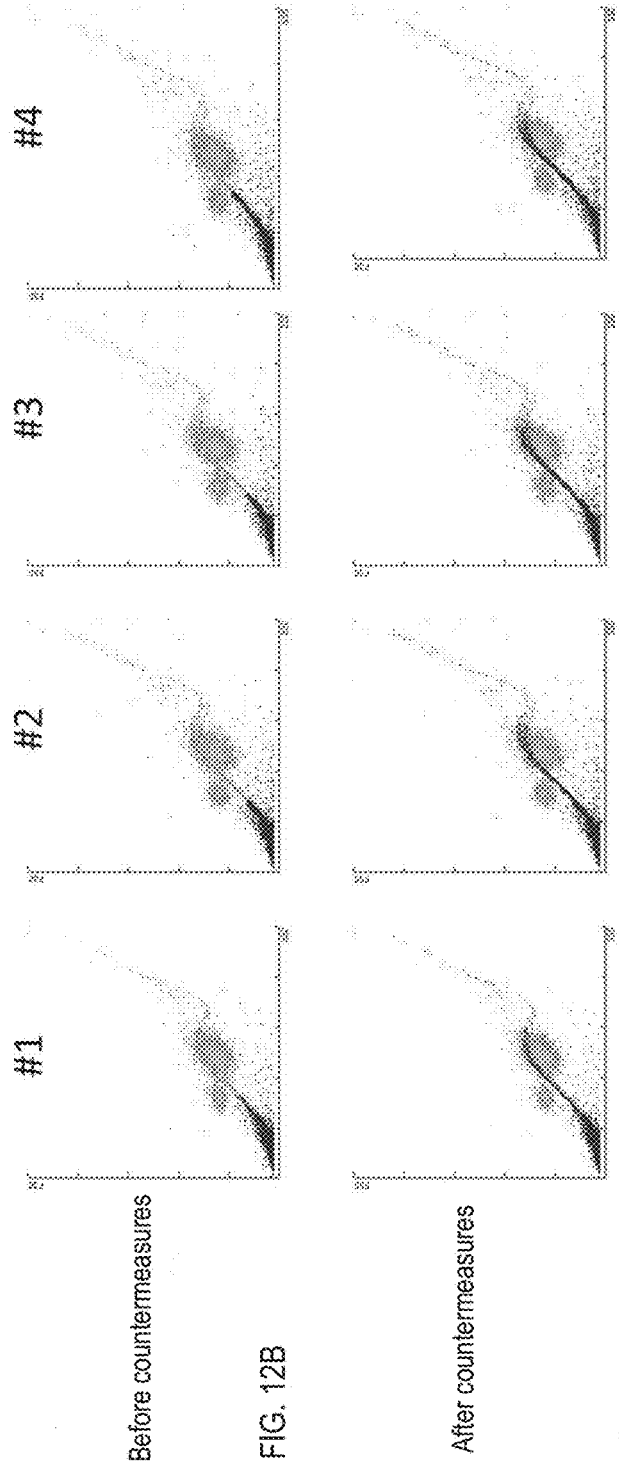
FIG. 12A shows the maximum value, the maximum value, and the fractionation position of each sample.
FIG. 12B shows a scattergram of the pulse peak (SSC) of the laterally scattered light signal before and after the countermeasure for the four samples containing the lipid particles-pulse peak (FSC) of the forward scattered light signal.

FIG. 12 shows the results of applying the measurement method of the present embodiment to peripheral blood samples #1, #2, #3, #4, and #5. Sample #5 does not contain lipid particles, and all other samples are samples that contain lipid particles. FIG. 12A shows the maximum maximum value (peak indicating leukocytes), maximum value (peak indicating lipid particles), and fractionation position (minimum minimum value) of each sample. The maximum maximum value was channel 14 in all 5 samples. The maximum value was channel 10 or 9 in 4 samples containing lipid particles. The fractionation position was channel 11 in all four samples containing lipid particles. FIG. 12B shows a scattergram of the pulse peak (SSC) of the side scattered light signal and the pulse peak (FSC) of the forward scattered light signal of the four samples containing lipid particles before and after the countermeasure. After the countermeasures, the lipid particle dots overlapping the leukocyte fraction were identified and displayed.

Figures 13A, 13B:
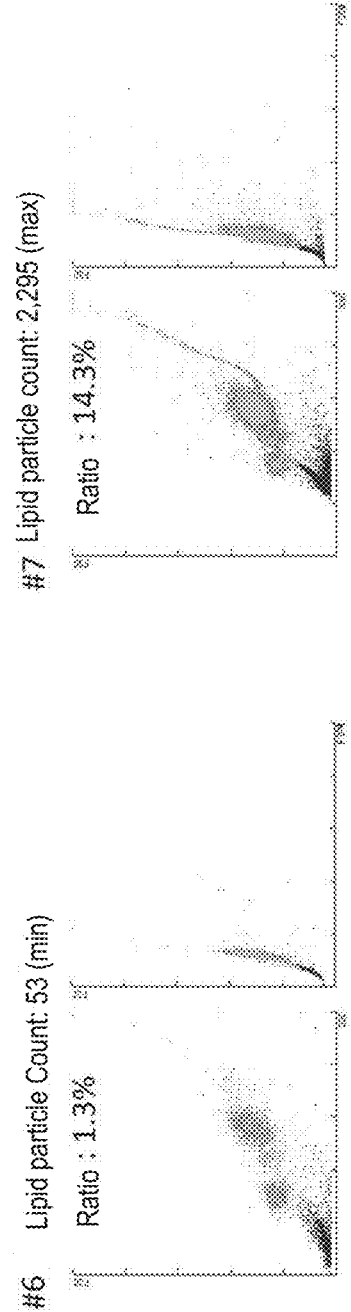
FIG. 13A shows the frequency of lipid particle positive samples in each data group.
FIG. 13B shows a scattergram of a pulse peak (SSC) of the side scattered light signal-pulse peak (FSC) of the forward scattered light signal of the sample (#6) having the lowest content of lipid particles and the sample (#7) having the highest content of lipid particles among the positive samples of lipid particles, and a scattergram of the pulse width of the forward scattered light signal-pulse peak of the forward scattered light signal.

FIG. 13A shows the frequency of lipid particle positive samples in each data group. FIG. 13B shows a scattergram of the pulse peak of side scattered light (SSC)-forward scattered light (FSC) and a scattergram of the pulse width of the forward scattered light signals (FSCW)-pulse peak of the forward scattered light signals (FSC) of the sample (#6) having the lowest lipid particle content and the sample (#7) having the highest lipid particle content among the lipid particle positive samples. The lipid particle content ratio of sample #6 was 1.4%, and the number of lipid particles was 53. The lipid particle content ratio of sample #7 was 14.3%, and the number of lipid particles was 2295. From this, it was considered that if the number of lipid particles is at least 50, auxiliary information which is information based on the determination result of whether the lipid particles are present can be output. Since the simultaneous reproducibility of the leukocyte count was less than 3%, it was considered that there was no problem with the threshold value of the lipid content for outputting auxiliary information as 3%.

FIG. 14 shows the white blood cell count (WBC-D) measured in the DIFF mode in which the peripheral blood samples #1, #2, #3, and #4 are fluorescently stained, and the white blood cell count (uncorrected WBC-C) measured in the normal CBC mode, and the white blood cell count (corrected WBC-C) after correction by the measurement method of the present embodiment. Although the value before WBC-C correction was significantly different from the value of WBC-D In the samples other than sample #1, which is the reference value, the value after WBC-C correction approximated the value of WBC-D. The rate of increase of the value after WBC-C correction is 0.3% to 2.5% of the value of WBC-D, which is sufficiently acceptable considering that the upper limit of simultaneous reproducibility of WBC is 3%.

From the above, according to the present embodiment, leukocytes and lipid particles can be fractionated without using a fluorescent dye. In this way the white blood cell count of the patient sample containing the lipid particles can be accurately counted only in the CBC measurement mode without the fluorescent dye, regardless of the DIFF measurement mode using the fluorescent dye, or a notification that the sample contains lipid particles can be appended to the measurement result, and an accurate test result can be provided for the sample containing the lipid particles while reducing the test cost.

In the present specification, the measurement method is not limited. For example, information relating to lipid particles contained in the measurement sample can be obtained using the scattergram shown by the pulse width (FSCW) of the forward scattered light signal and the pulse peak (FSC) of the forward scattered light signal shown in FIG. 1B. In this case, information of the lipid particles can be obtained by gating the region where the lipid particle dots in the broken line in FIG. 1B are indicated by the dotted lines and counting the particles appearing in the gate.

As another example, information relating to lipid particles contained in the measurement sample also may be obtained from a two-dimensional dot plot of two-dimensional coordinates obtained by converting a scattergram of the pulse width (FSCW) of the forward scattered light signal and the pulse peak (FSC) of the forward scattered light signal shown in FIG. 2A by a rotation matrix. In this case, the white blood cell count region located on the x'-axis high value side with respect to the boundary line A and the lipid particle dot region located on the x'-axis low value side with respect to the boundary line A can be separated by drawing a boundary line A on FIG. 2B, which is a two-dimensional dot plot of two-dimensional coordinates (x', y').

In the present specification, the present invention is not limited to an example in which blood cells contained in a sample are counted by one or a plurality of measurement modes selected by a user from a plurality of measurement modes including a CBC measurement mode and a DIFF measurement mode. For example, blood cells contained in a sample also may be counted only by the CBC measurement mode.

In the present specification, the rotation angle θ is not limited. For example, the rotation angle may be about 8° to 12°, preferably about 9° to 11°, more preferably about 9.5° to 10.8°, and even more preferably about 10.0° to 10.6°.

In the present specification, the measurement sample is not limited. For example, the measurement sample may contain a stock solution of a sample of blood (peripheral blood, arterial blood, venous blood, and the like) and body fluid (bone marrow fluid, cerebrospinal fluid, joint fluid, and the like), or a diluted solution of the sample. Blood is preferably collected in the presence of an anticoagulant.

In the present specification, particles are not limited. For example, particles can include cellular and non-cellular particles. The cells are intended to be cells derived from a subject from whom the measurement sample was taken. Cells include erythrocytes, leukocytes, platelets, immature erythrocytes, immature erythrocytes, immature lymphocytes, micromegacariosites, tumor cells (for example, leukemia cells, malignant lymphoma cells, multiple myeloma, and the like), malaria-infected erythrocytes, and the like. Non-cellular particles can include lipid particles, bacteria, fungi (for example, yeast) and the like.

In the present specification, the "plurality" of a plurality of feature values relating to light scattering is not limited. For example, "plural" is not limited insofar as the plurality is two or more.

In the present specification, the embodiment has been described by showing an example in which the processing unit 201 that executes the measurement program 202b is mounted on the measurement device 200. However, the measurement program 202b also may be executed on another computer that does not have the flow cytometer 230. For example, via a network such as a cloud, another computer acquires the measured values of a plurality of parameters related to scattered light from the flow cytometer 230 for each particle, and the processing unit of another computer executes the measurement program 202b.

What is claimed is:

1. A measurement method for measuring a number of particles in a blood sample prepared without using a fluorescent dye, comprising:
   obtaining information related to lipid particles contained in the blood sample based on a plurality of feature values regarding light scattering from each particle, the feature values being obtained by a flow cytometer from individual particles contained in the blood sample; and
   when a ratio of the lipid particles with respect to detected total particles is equal to or greater than a predetermined value, or when a number of lipid particles is equal to or greater than a predetermined value relative to a measured value of the number of particles,
   outputting information on a reliability of the measurement value of a white blood cell count.

2. The measurement method according to claim 1, wherein the plurality of feature values relating to light scattering are a width of a pulse waveform of a forward scattered light signal corresponding to each particle and a peak height of the pulse waveform of the forward scattered light signal.

3. The measuring method according to claim 2, wherein the information related to the lipid particles is generated by extracting coordinates representing lipid particles from coordinates indicating the width of the pulse waveform of the forward scattered light signal and the peak height of the pulse waveform of the forward scattered light signal obtained from the individual particles via rotation matrix.

4. The measuring method according to claim 3, wherein the information related to the lipid particles is generated by peak analysis of a histogram projected in an axial direction corresponding to a first principal component in coordinates converted by the rotation matrix.

5. The measuring method according to claim 4, wherein a peak value is corrected in the peak analysis of the histogram to generate information related to the lipid particles.

6. The measuring method according to claim 4, wherein
   a search range of peaks in the peak analysis of the histogram is limited to generate information related to the lipid particles.

7. The measurement method according to claim 1, wherein a number of nucleated cells in the blood sample is counted based on a scattered light generated by irradiating the individual particles with light.

8. The measurement method according to claim 1, further comprising:
   determining whether a measurement value is affected by the lipid particles based on the information related to the lipid particles, and outputting information based on the determination result.

9. The measurement method according to claim 1, wherein the information related to the lipid particles is information regarding a reliability of a measurement value of a white blood cell count.

10. The measurement method according to claim 1, wherein the measurement value of the particle number is corrected based on the information related to the lipid particles, and the corrected value is output as the measurement value of the white blood cell count.

11. The measuring method according to claim 1, wherein
   the information related to the lipid particles is a number of lipid particles or a ratio of the lipid particles in a particle group.

12. The measurement method according to claim 1, wherein
   the information related to the lipid particles is obtained after coordinates of particles corresponding to a malaria-infected cells are excluded from the coordinates indicating the lipid particles.

13. A measurement device for measuring a number of cells in a blood sample prepared without using a fluorescent dye, comprising:

a flow cytometer and a processing unit;
wherein the processing unit
acquires information related to lipid particles contained in the blood sample based on a plurality of feature values regarding light scattering from each particle, the feature values being acquired by the flow cytometer from the individual particles contained in the blood sample, and
when a ratio of the lipid particles with respect to detected total particles is equal to or greater than a predetermined value, or when a number of lipid particles is equal to or greater than a predetermined value relative to a measured value of the number of particles,
outputs information on a reliability of the measurement value of a white blood cell count.

14. A computer-executable measurement program for measuring a number of cells in a blood sample, the program comprising:
a step of obtaining information related to lipid particles contained in the blood sample based on a plurality of feature values regarding light scattering from each particle, the feature values obtained by a flow cytometer from individual particles contained in the blood sample prepared without using a fluorescent dye, and
when a ratio of the lipid particles with respect to detected total particles is equal to or greater than a predetermined value, or when a number of lipid particles is equal to or greater than a predetermined value relative to a measured value of the number of particles,
another step of outputting information on a reliability of the measurement value of a white blood cell count.

15. A measurement method for measuring a number of particles in a blood sample, comprising:
obtaining information related to lipid particles contained in the blood sample based on a plurality of feature values regarding light scattering from each particle, the feature values being obtained by a flow cytometer from individual particles contained in the blood sample, and
when a ratio of the lipid particles with respect to detected total particles is equal to or greater than a predetermined value, or when a number of lipid particles is equal to or greater than a predetermined value relative to a measured value of the number of particles,
outputting information on a reliability of the measurement value of a white blood cell count.

16. The measurement method according to claim 15, wherein
a blood cell count measurement for measuring the number of particles in the blood sample based on scattered light generated by irradiating the individual particles with light is accomplished without using feature values related to fluorescence.

* * * * *